Oct. 27, 1970 D. LÉONARD 3,537,026
FREQUENCY SYNTHESIZER SUPPLYING A PAIR OF FREQUENCIES SEPARATED BY A FIXED STEP
Filed Oct. 28, 1968
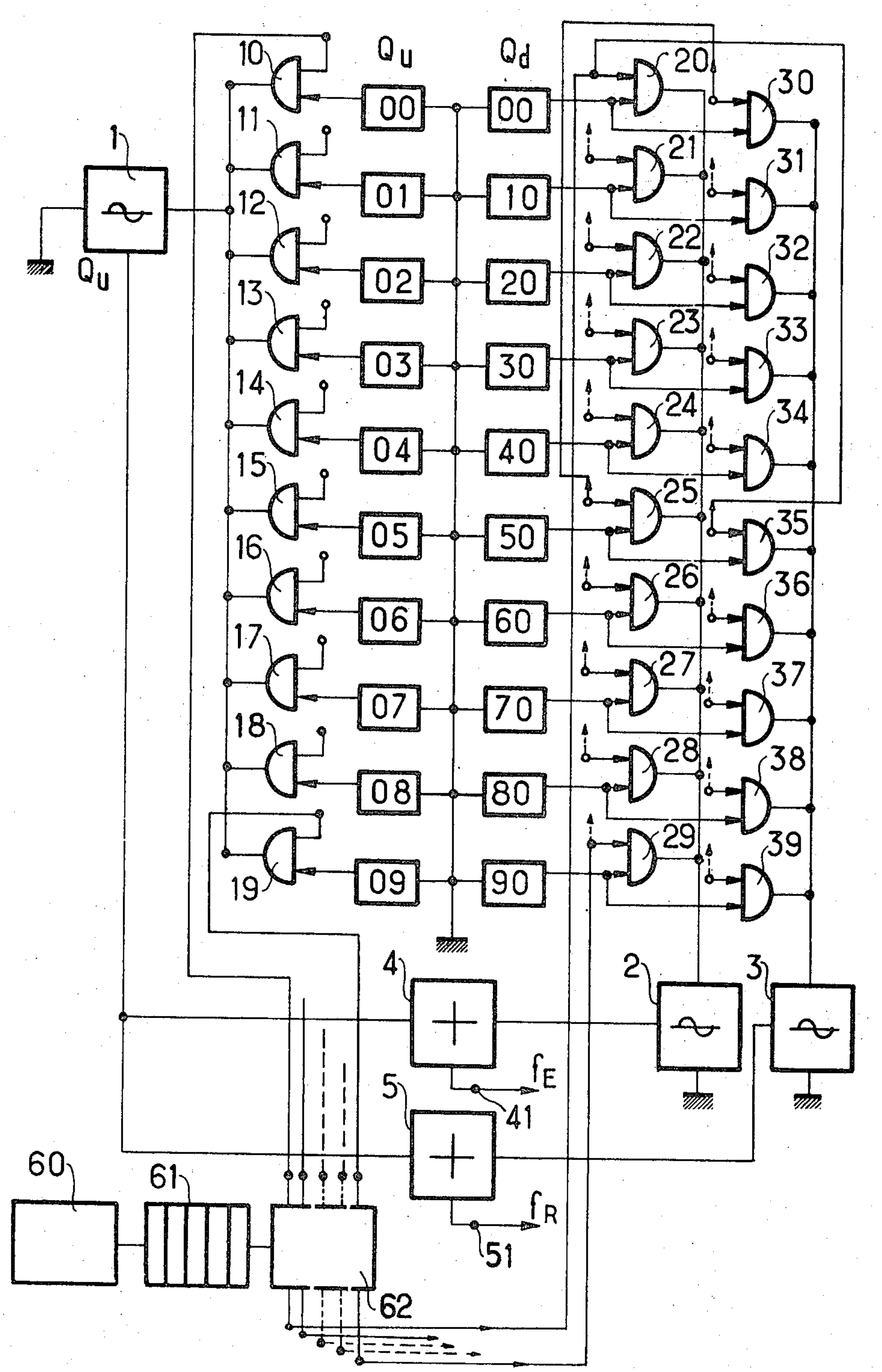

United States Patent Office 3,537,026
Patented Oct. 27, 1970

3,537,026

FREQUENCY SYNTHESIZER SUPPLYING A PAIR OF FREQUENCIES SEPARATED BY A FIXED STEP

Didier Léonard, Boulogne, France, assignor to C.I.T.-Compagnie Industrielle des Telecommunications, Paris, France, a French corporation Filed Oct. 28, 1968, Ser. No. 771,008
Claims priority, application France, Oct. 30, 1967, 126,288
Int. Cl. H03b *21/02*
U.S. Cl. 331—38 10 Claims

ABSTRACT OF THE DISCLOSURE

Frequency synthesizer with two outputs, supplying respective frequencies separated by a fixed frequency step, for example separated by fifty elementary frequency steps, in a group of one hundred frequencies numbered from 1 to 100, comprising three oscillators, two mixers, twenty quartz crystals, and three AND gate combinations.

This invention relates to a simplified frequency synthesizer adapter to supply a limited number of frequencies and having two outputs at which are provided selectively two frequencies separated by a constant spacing.

The synthesizer of the invention has particular application in a transmitter/receiver station forming part of a network interconnecting correspondents in duplex radio connection by means of carrier frequencies that have been made available. Such a transmitter/receiver station is described in detail in co-pending application Ser. No. 750,986, filed Aug. 7, 1968.

In the system described in the co-pending application a certain number N of carrier frequencies, for instance $N=100$, are accorded to the network. Each transmitter/receiver station of the network is equipped with a simplified frequency synthesizer which is to supply a frequency for transmission ($f_E$) and a frequency for reception ($f_R$). For reasons of symmetry, also leading to simplification of the construction of the station, the condition is imposed that between these two frequencies there is always a spacing of $N/2$ frequency steps. For example, for one of a pair of stations in duplex connection at a given moment with $N=100$, if the transmission is occurring on frequency number 28, at the same time the reception will be on frequency number 78. Of course in the second station of the pair in duplex connection, the receiving frequency will be number 28 and the transmission frequency will be number 78. Any station calling any other station can in principle have its transmission on any of the frequencies between 1 and 100; the choice of the transmission frequency depends on which pair of frequencies is found first to be free by an exploration device which is incorporated into each of the stations of the network. If the transmission frequency lies between frequency numbers 1 and 50, the associated reception frequency lies between numbers 51 and 100, respectively. Likewise, if the transmission frequency lies between frequency numbers 51 and 100, the associated reception frequencies lie between the numbers 1 and 50, respectively.

With such methods of connection, making use of a group of channels of narrow bandwidth, it is essential for the transmission carrier frequency and the demondulation frequency used for reception to be very stable. They are necessarily produced by oscillators stabilized by quartz crystal control, hereinafter referred to simply as "quartz" oscillators.

Although it is possible to arrange a transmitter/receiver having $N=100$, with two oscillators each with 100 quartz crystals, one quartz crystal being selected each time for each frequency, such an arrangement would be very expensive.

An object of the invention accordingly, is the provision of an improved synthesizer providing a simpler more economical construction.

In accordance with the broadest aspect of this invention a frequency synthesizer has a range of frequency positions, at each of which a unique frequency is delivered, and is provided with a switching arrangement operable to select simultaneously any pair of frequencies spaced from one another by a constant number of frequency positions, the synthesizer including: a lower order oscillator selectively connectable to a first set of quartz crystals to provide a lower order frequency determined by the quartz crystal to which the lower order oscillator is connected; two higher order oscillators simultaneously connectable to respective positions in a second set of quartz crystals to provide respective higher order frequencies determined by the two selected quartz crystals which are always spaced from one another by a constant number of frequency positions in the second set; first and second modulators receiving respectively said higher order frequencies and both receiving said lower order frequency, the two modulators providing respective output frequencies spaced by a constant amount in the range of frequency positions; and a logic circuit controlling the selection of the quartz crystals determining the output frequencies of the three oscillators, in accordance with a logic input signal significant of the output frequency pair to be delivered.

A synthesizer constructed in accordance with the invention can be much simplified and requires relatively few quartz crystals to produce a large range of stable output frequencies which are delivered in pairs having a constant number of frequency positions between the two frequencies forming each pair. The two frequencies of a pair can provide respectively the transmission carrier frequency and the demodulating frequency of a transmitter/receiver station such as is described in our co-pending application.

In one example of the invention described in more detail below, a synthesizer supplies two frequencies selected from among a group of N frequencies, for instance $N=100$, and has three oscillators, one "unit" oscillator one "tens transmission" oscillator, and one "tens reception" oscillator. A set of ten quartz crystals of units 0 to 9 is provided each of which is connectable to the 'unit" oscillator by an AND gate. A second set of ten "tens" quartz crystals, for 00 to 90 are also provided and each of which is connnectable to the "ten transmission" oscillator by a selected one of a second set of AND gates and to the "tens reception" oscillator by a selected one of a third set of AND gates. The "transmission" AND gates forming the second set and numbered 00 to 40 have each an input in common with respective "reception" AND gates of the third set and numbered 50 to 90, respectively. The "transmission" gates numbered 50 to 90 each have an input common with the "reception" gates numbered 00 to 40, respectively.

The modulators are preferably constructed as adders and one of the modulators serves for the addition of a "unit" frequency with a "tens transmission" frequency, and the second modulator is arranged as an adder for the addition of the "tens reception" frequency with the same "unit" frequency.

The logic circuit preferably comprises a clock, a counter, and means for decoding and providing a "unit" output and a "tens" output, a functional connection with the set of "unit" AND gates and with the two sets of "tens" AND gates.

The invention will now be described in more detail, by way of example, with reference to the accompanying drawing which is a schematic diagram of a synthesizer providing pairs of frequencies, the frequencies of each pair being spaced from one another in a range of output frequency positions by a constant spacing.

A "unit" oscillator 1 may be connected by one of ten AND gates 10 to 19, to a "unit" set $Q_u$ of quartz crystals made up of ten quartz crystals marked 00 to 90.

A "tens transmission" oscillator 3 may be connected by one of the set of ten AND gates, 30 to 39, to one of the set $Q_d$ of "tens" quartz crystals. Each gate has an order input.

The order input of the gate 20 is connected to the order input of the gate 35 and so on up to the order input of the gate 24 which is connected to the order input of the gate 39. The order input of the gate 25 is connected to the order input of the gate 30 and so on up to the order input of the gate 29 which is connected to the order input of the gate 34. The output of the "unit" oscillator 1 and the output of the "tens reception" oscillator 2 are connected to two inputs of a frequency adder 4, consisting essentially of a modulation and filtering device having an output terminal 41 where a reception frequency $f_R$ equal to the sum of the input frequencies is picked up. The output of the oscillator 1 and the output of the "tens transmission" oscillator 3 are connected to two inputs of a second frequency adder 5 similar to the adder 4 and having an output terminal 51 where a transmission frequency $f_E$ is picked up.

The order inputs controlling operation of the "unit" AND gates 10 to 19 and the order inputs of the two sets of "tens" AND gates 20 to 29, 30 to 39 respectively, are controlled by a decoder 62 forming part of a logic circuit which includes a clock 60 and a counter 61. The decoder controls the connection of the quartz crystals to the oscillators in accordance with the values stored in the counter.

The functioning of the synthesizer is as follows: when the decoder 62 applies a "one" logic order signal to a selected one of the "unit" gates 10 to 19, for instance the gate 18, the associated quartz crystal 08 is connected through the open AND gate 18 to the oscillator 1 which therefore supplies the corresponding unit frequency. If the decoder 62 simultaneously applies a "one" logic order signal to the "tens reception" AND gate 22, and therefore simultaneously to the "tens transmission" AND gate 37, the "tens reception" oscillator 2 supplies the frequency of quartz crystal 20 and the "tens transmission" oscillator 3 supplies the frequency of quartz crystal 70. Each "tens" frequency is added to the "unit" frequency and thus there issues from the terminal 41 a frequency $f_R=28$ and from the terminal 51 a second frequency $f_E=78$. A spacing of 50 frequency positions appears between them.

This spacing of 50 is found between $f_R$ and $f_E$ at all outputs of the synthesizer determined by the decoder 62. Either frequency $f_E$ or frequency $f_R$ may occupy any position in the range of frequency occupying a position in the range spaced by 50 frequency positions.

Of course the choice of N=100 has been given only by way of example, the invention applying in principle to any even N number.

The invention may be applied to more than two decimal orders, for instance to three orders; units, tens, hundreds, with two oscillators for the hundreds, one for the tens, and one for the units.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are obvious to one of ordinary skill in the art.

What is claimed is:

1. A frequency synthesizer having a range of frequency positions at each of which a unique frequency is delivered and being operable to select simultaneously any pair of frequencies spaced from one another by a constant number of frequency positions, comprising first and second sets of quartz crystals, first lower order oscillator means selectively connectable to said first set of crystals to provide a lower order frequency determined by the crystal to which the oscillator is connected;

second and third higher order oscillator means simultaneously connectable to respective positions in said second set of crystals to provide respective first and second higher order frequencies spaced from one another by a constant number of frequency positions and determined by the two selected crystals of the second set;

first and second modulators receiving respectively said first and second higher order frequencies and both receiving said lower order frequency, the two modulators providing respectively output frequencies spaced by a constant amount in the range of frequency positions; and logic circuit means for controlling the connection of the crystals to the respective oscillators determining the output frequencies of the three oscillators in accordance with a logic input signal significant of the output frequency pair to be delivered.

2. A synthesizer as claimed in claim 1, in which the lower order oscillator is selectively connectable to a set of ten quartz crystals each providing a successive unit frequency step in said range of frequency positions, and the higher order oscillators are connectable respectively to different positions in the second set of quartz crystals each providing a successive frequency step of ten units in said range of frequency positions.

3. A synthesizer as claimed in claim 1 in which said logic circuit means includes a first set of AND gates respectively connected between the crystals of the first set and the lower order oscillator and selectively opened by a logic circuit, a second set of AND gates respectively connected between the crystals of the second set and the first higher order oscillator, and a third set of AND gates respectively connected between the crystals of the second set and the second higher order oscillator, said logic circuit simultaneously connecting two crystals having a constant frequency step spacing in the second set to associated AND gates of the second and third sets of AND gates.

4. A synthesizer as claimed in claim 1, in which said first and second modulators are adders which add the respective received frequencies to provide two output frequencies spaced by a constant number of frequency positions.

5. A synthesizer as claimed in claim 1, in which the lower order oscillator provides ten "unit" frequency positions up to 9, the higher order oscillators each provide ten "tens" frequency positions up to 90, and the spacing between a pair of delivered frequency is 50 frequency positions.

6. A synthesizer as claimed in claim 1, in which the logic circuit includes a clock providing clock pulses, a counter receiving said clock pulses, and a decoder connected to said counter which controls the connection of the sets of crystals to said first, second and third oscillators in accordance with the values stored in said counter.

7. A frequency synthesizer having a range of frequency positions at each of which a unique frequency is delivered and being operable to select simultaneously any pair of frequencies spaced from one another by a constant number of frequency positions, comprising a first set of ten quartz crystals each providing a successive unit frequency step in said range of frequency positions, a second set of ten quartz crystals each providing a successive frequency step of ten units in said range of frequency positions, a first lower order oscillator selectively connectable to one of first set of quartz crystals to provide a lower order frequency determined by the crystal to which the oscillator is connected, a second and a third higher order oscillator simultaneously connectable to respective ones of said second set of quartz crystals to provide respective first and second higher order frequencies determined by the crystals to which the respective oscillators are connected, switching means for selectively connecting said first oscillator to a quartz crystal and said second and third oscillators to respective quartz crystals providing frequencies spaced by a constant amount, logic circuit means for controlling actuation of said switching means in response to a logic input signal significant of the crystals to be selected, and first and second modulators connected respectively to said second and third oscillators and both connected to said first oscillator to provide respective output frequencies spaced by a constant amount in the range of frequency positions.

8. A synthesizer as claimed in claim 7 in which said switching means includes a first set of AND gates respectively connected between the crystals of said first set and said first oscillator, a second set of AND gates respectively connected between the crystals of said second set and said second oscillator, and a third set of AND gates respectively connected between the crystals of the third set and said third oscillator, the AND gates of said first, second and third sets each being provided with an order input connected to said logic circuit means.

9. A synthesizer as claimed in claim 8 in which the order input of each AND gate of said second set is connected to the order input of the AND gate of said third set associated with a crystal providing a frequency spaced from the frequency of the crystal connected to the AND gate of the second set by a constant amount.

10. A synthesizer as claimed in claim 9, in which the logic circuit includes a clock providing clock pulses, a counter receiving said clock pulses, and a decoder connected to said counter which controls the connection of the sets of crystals to said first second and third oscillators in accordance with the values stored in said counter.

References Cited

UNITED STATES PATENTS 2,529,443 11/1950 Bach ---------------- 331—161

JOHN KOMINSKI, Primary Examiner

U.S. Cl. X.R.

331—40, 161